United States Patent
Lewis et al.

(10) Patent No.: US 9,111,218 B1
(45) Date of Patent: Aug. 18, 2015

(54) METHOD AND SYSTEM FOR REMEDIATING TOPIC DRIFT IN NEAR-REAL-TIME CLASSIFICATION OF CUSTOMER FEEDBACK

(75) Inventors: Glenn M. Lewis, Costa Mesa, CA (US); Kirill Buryak, Sunnyvale, CA (US); Aner Ben-Artzi, Los Angeles, CA (US); Jun Peng, San Ramon, CA (US); Nadav Benbarak, Boston, MA (US)

(73) Assignee: GOOGLE INC., Mountain View, CA (US)

( * ) Notice: Subject to any disclaimer, the term of this patent is extended or adjusted under 35 U.S.C. 154(b) by 268 days.

(21) Appl. No.: 13/530,667

(22) Filed: Jun. 22, 2012

Related U.S. Application Data

(60) Provisional application No. 61/580,503, filed on Dec. 27, 2011, provisional application No. 61/594,759, filed on Feb. 3, 2012.

(51) Int. Cl.
  *G06F 15/18* (2006.01)
  *G06F 7/00* (2006.01)
  *G06F 17/30* (2006.01)
  *G06N 5/04* (2006.01)

(52) U.S. Cl.
  CPC .......................................... *G06N 5/04* (2013.01)

(58) Field of Classification Search
  None
  See application file for complete search history.

(56) References Cited

U.S. PATENT DOCUMENTS

| | | |
|---|---|---|
| 6,446,061 B1 | 9/2002 | Doerre et al. |
| 6,751,614 B1 | 6/2004 | Rao |
| 6,886,010 B2 | 4/2005 | Kostoff |
| 7,158,986 B1 | 1/2007 | Oliver et al. |
| 7,249,312 B2 | 7/2007 | Jasper et al. |
| 7,401,087 B2 | 7/2008 | Copperman et al. |
| 7,496,567 B1 | 2/2009 | Steichen |
| 7,565,369 B2 * | 7/2009 | Fan et al. .............................. 1/1 |
| 7,584,100 B2 | 9/2009 | Zhang et al. |
| 7,593,904 B1 | 9/2009 | Kirshenbaum et al. |
| 7,937,345 B2 | 5/2011 | Schmidtler et al. |
| 7,958,067 B2 | 6/2011 | Schmidtler et al. |
| 8,090,717 B1 | 1/2012 | Bharat et al. |

(Continued)

OTHER PUBLICATIONS

Forman, George. "Tackling concept drift by temporal inductive transfer." Proceedings of the 29th annual international ACM SIGIR conference on Research and development in information retrieval. ACM, 2006.*

(Continued)

*Primary Examiner* — Kakali Chaki
*Assistant Examiner* — Daniel Pellett
(74) *Attorney, Agent, or Firm* — Armstrong Teasdale LLP

(57) ABSTRACT

A method and system of classifying documents is provided. The method includes receiving a stream of documents from at least one user wherein each document includes a topic of information relating to a customer support issue or sentiment. The method includes classifying each of the received documents using a plurality of trained classifiers, the classification based on a voting by the trained classifiers, each document labeled according to a similar topic. A drift of the topic of one or more of the classifications is determined wherein the drift is related to the received documents that include information relating to an unclassified customer support issue or sentiment. If the determined drift exceeds a predetermined threshold range, rebuilding the plurality of classifiers to include a second set of classifiers trained to recognize the unclassified customer support issue or sentiment.

20 Claims, 5 Drawing Sheets

(56) References Cited

U.S. PATENT DOCUMENTS

| | | | |
|---|---|---|---|
| 8,180,760 B1 | 5/2012 | Carver et al. | |
| 8,977,620 B1* | 3/2015 | Buryak et al. | 707/737 |
| 9,002,848 B1* | 4/2015 | Peng et al. | 707/737 |
| 2003/0130993 A1 | 7/2003 | Mendelevitch et al. | |
| 2005/0044487 A1 | 2/2005 | Bellegarda et al. | |
| 2006/0095521 A1 | 5/2006 | Patinkin | |
| 2006/0155575 A1 | 7/2006 | Gross | |
| 2007/0027830 A1 | 2/2007 | Simons et al. | |
| 2007/0260568 A1* | 11/2007 | Perng et al. | 706/47 |
| 2008/0222060 A1* | 9/2008 | Perng et al. | 706/12 |
| 2010/0017487 A1 | 1/2010 | Patinkin | |
| 2010/0122212 A1 | 5/2010 | Boudalier | |
| 2010/0138377 A1* | 6/2010 | Wright et al. | 706/52 |
| 2010/0223276 A1 | 9/2010 | Al-Shameri et al. | |
| 2010/0287162 A1 | 11/2010 | Shirwadkar | |
| 2011/0035379 A1 | 2/2011 | Chen et al. | |
| 2011/0145178 A1 | 6/2011 | Schmidtler et al. | |
| 2011/0184806 A1 | 7/2011 | Chen et al. | |
| 2011/0282878 A1 | 11/2011 | Bird et al. | |
| 2012/0078969 A1 | 3/2012 | Ananthanarayanan et al. | |
| 2012/0101974 A1 | 4/2012 | Duan et al. | |
| 2012/0137367 A1 | 5/2012 | Dupont et al. | |
| 2013/0117267 A1 | 5/2013 | Buryak et al. | |
| 2013/0151520 A1* | 6/2013 | Ankan et al. | 707/737 |

OTHER PUBLICATIONS

Bifet, Albert, and Ricard Gavalda. "Kalman filters and adaptive windows for learning in data streams." Discovery Science. Springer Berlin Heidelberg, 2006.*

Lindstrom, Patrick, Sarah Jane Delany, and Brian Mac Namee. "Handling Concept Drift in a Text Data Stream Constrained by High Labelling Cost." FLAIRS Conference. 2010.*

Aggarwal, Charu C., et al. "A framework for clustering evolving data streams." Proceedings of the 29th international conference on Very large data bases—vol. 29. VLDB Endowment, 2003.*

Aggarwal, Charu C. "On change diagnosis in evolving data streams." Knowledge and Data Engineering, IEEE Transactions on 17.5 (2005): 587-600.*

Becker, Hila, and Marta Arias. "Real-time ranking with concept drift using expert advice." Proceedings of the 13th ACM SIGKDD international conference on Knowledge discovery and data mining. ACM, 2007.*

Bifet, Albert, et al. "New ensemble methods for evolving data streams." Proceedings of the 15th ACM SIGKDD international conference on Knowledge discovery and data mining. ACM, 2009.*

Chu, Fang, and Carlo Zaniolo. "Fast and light boosting for adaptive mining of data streams." Advances in Knowledge Discovery and Data Mining. Springer Berlin Heidelberg, 2004. 282-292.*

Dries, Anton, and Ulrich Rückert. "Adaptive concept drift detection." Statistical Analysis and Data Mining 2.5-6 (2009): 311-327.*

Klinkenberg, Ralf. "Concept drift and the importance of examples." Text mining—theoretical aspects and applications. 2003.*

Kifer, Daniel, Shai Ben-David, and Johannes Gehrke. "Detecting change in data streams." Proceedings of the Thirtieth international conference on Very large data bases—vol. 30. VLDB Endowment, 2004.*

Wang, Haixun, et al. "Mining concept-drifting data streams using ensemble classifiers." Proceedings of the ninth ACM SIGKDD international conference on Knowledge discovery and data mining. ACM, 2003.*

Wang, Shenghui, Stefan Schlobach, and Michel Klein. "What is concept drift and how to measure it?." Knowledge Engineering and Management by the Masses. Springer Berlin Heidelberg, 2010. 241-256.*

Carvalho, Vitor R., and William W. Cohen. "Single-pass online learning: Performance, voting schemes and online feature selection." Proceedings of the 12th ACM SIGKDD international conference on Knowledge discovery and data mining. ACM, 2006.*

Kolter, Jeremy Z., and Marcus A. Maloof. "Using additive expert ensembles to cope with concept drift." Proceedings of the 22nd international conference on Machine learning. ACM, 2005.*

Hulten, Geoff, Laurie Spencer, and Pedro Domingos. "Mining time-changing data streams." Proceedings of the seventh ACM SIGKDD international conference on Knowledge discovery and data mining. ACM, 2001.*

\* cited by examiner

METHOD AND SYSTEM FOR REMEDIATING TOPIC DRIFT IN NEAR-REAL-TIME CLASSIFICATION OF CUSTOMER FEEDBACK

CROSS REFERENCE TO RELATED APPLICATIONS

This application claims priority to provisional patent application Ser. No. 61/580,503 filed on Dec. 27, 2011, and provisional patent application Ser. No. 61/594,759 filed on Feb. 3, 2012, which are both hereby incorporated by reference in their entirety.

BACKGROUND OF THE INVENTION

The field of the invention relates generally to information management, and more specifically, to methods and systems for classification and clustering of inbound communications to an organization or entity.

Organizations and businesses can receive a large number of messages from customers, potential customers, users and/or other people. For example, a business and/or organization can receive messages from its customers and potential customers, such as email messages, messages from online forums, e.g., support forums or message boards, and other types of messages. These messages can be related to a variety of different topics or issues. For example, the messages can be related to problems experienced by a user and can include a request for assistance to solve the problem. Oftentimes, these request messages are directed to a support center at the organization/business.

In addition, the Internet provides these organizations and businesses with access to a wide variety of resources, including web pages for particular topics, reviews of products and/or services, news articles, editorials and blogs. The authors of these resources can express their opinions and/or views related to a myriad of topics such a product and/or service, politics, political candidates, fashion, design, etc. For example, an author can create a blog entry supporting a political candidate and express their praise in the candidate's position regarding fiscal matters or social issues. As another example, authors can create a restaurant review on a blog or on an online review website and provide their opinions of the restaurant using a numerical rating (e.g., three out of five stars), a letter grade (e.g., A+) and/or a description of their dining experience to indicate their satisfaction with the restaurant.

Such a large volume of documents (i.e., different types of electronic documents including text files, e-mails, images, metadata files, audio files, presentations, etc.) can be very difficult for organizations and/or businesses to manage. Entities may try to use classification or clustering techniques to manage such a large volume of documents. Various algorithms can be used on a corpus of documents to produce different clusters of documents such that the documents within a given cluster share a common characteristic. Over time, new products or features offered by the organizations and businesses may cause documents relating to customer support issues or sentiment directed to the new products or features to be generated. Current classification and clustering algorithms will group the new documents into existing classes or groups that may not be directly associated with the new customer support issues or sentiment. Consequently, an awareness of the new customer support issues or sentiment may go unnoticed or an importance of an unrelated topic may be erroneously accentuated by increased numbers of documents in groups associated other topics.

BRIEF DESCRIPTION OF THE INVENTION

In one embodiment, a computer-implemented method of classifying documents includes receiving a stream of documents from at least one user wherein each document includes a topic of information relating to a customer support issue or sentiment. The method includes classifying each of the received documents using a plurality of trained classifiers, the classification based on a voting by the trained classifiers, each document labeled according to a similar topic. A drift of the topic of one or more of the classifications is determined wherein the drift is related to the received documents that include information relating to an unclassified customer support issue or sentiment. If the determined drift exceeds a predetermined threshold range, rebuilding the plurality of classifiers to include a second set of classifiers trained to recognize the unclassified customer support issue or sentiment. The method further includes outputting a frequency of occurrence of each classifier, the frequency based on the classifying.

In another embodiment, a computer system includes at least one of a classifier and a clustering engine, the classifier configured to receiving a stream of documents from at least one user, each document including a topic of information relating to a customer support issue or sentiment, the classifier configured to classify each of the received documents using a plurality of trained classifiers, the classification based on a voting by the trained classifiers, each document labeled according to a similar topic, the clustering engine configured to cluster the plurality of documents into respective groups based on the determined topic using the clustering engine, the clustering engine configured to apply a word analysis. The system further includes a drift engine configured to determine a drift of the topic of one or more of the classifications wherein the drift is related to received documents that include information relating to an unclassified customer support issue or sentiment. If the determined drift exceeds a predetermined threshold range, at least one of rebuild the plurality of classifiers to include a second set of classifiers trained to recognize the unclassified customer support issue or sentiment and re-cluster the plurality of documents into an increased number of groups based on the determined topic using the clustering engine.

In yet another embodiment, one or more non-transitory computer-readable storage media having computer-executable instructions embodied thereon, wherein when executed by at least one processor, the computer-executable instructions cause the processor to receive a stream of documents from at least one user, and in near-real-time determine a topic of each received document wherein the topic includes information relating to a customer support issue or sentiment, cluster the plurality of documents into respective groups based on the determined topic using a clustering engine that applies a word analysis. The computer-executable instructions further cause the processor to determine a drift of the determined topic of one or more groups, the drift related to received documents that include information relating to an undetermined customer support issue or sentiment. If the determined drift exceeds a predetermined threshold range, increase a number of allowed groups and in a batch process, determine a topic of each received document wherein the topic includes information relating to a customer support issue or sentiment, re-cluster the plurality of documents into the increased number of groups based on the determined topic using the clustering engine, and output a frequency of occurrence of each topic, the frequency based on the clustering.

BRIEF DESCRIPTION OF THE DRAWINGS

FIG. 1 is a diagram of an example environment for grouping documents from a document corpus;

FIG. 2 is a data flow diagram of environment in accordance with another embodiment of the present invention;

FIG. 3 is a flow chart of a computer-implemented method of remediating topic drift for classifying documents in accordance with an exemplary embodiment of the present invention;

FIG. 4 is a flow chart of a computer-implemented method of remediating topic drift for clustering documents.

DETAILED DESCRIPTION OF THE INVENTION

Figure 1:
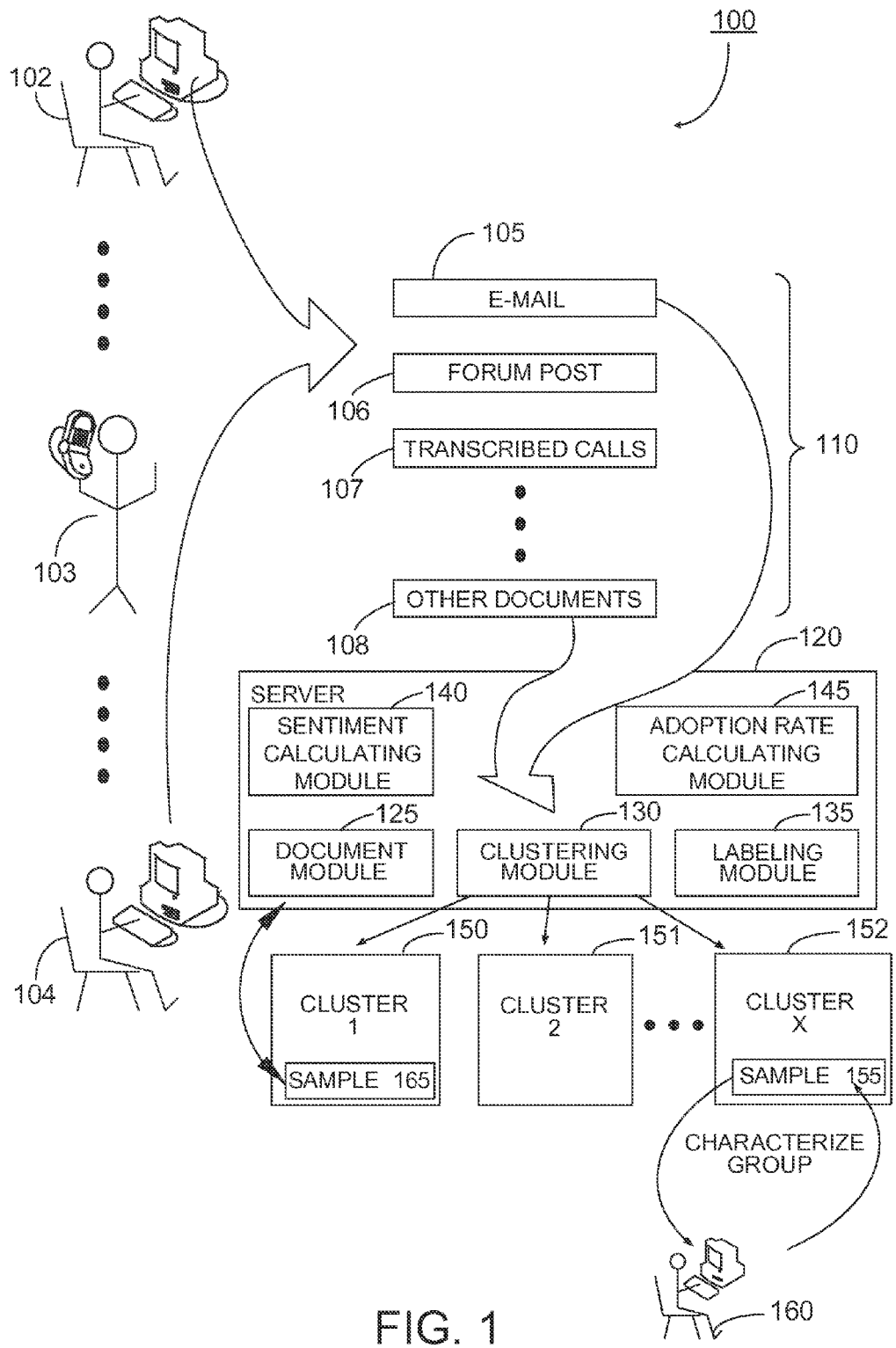
FIGS. 1-4 show exemplary embodiments of the method and apparatus described herein.

The following detailed description illustrates embodiments of the invention by way of example and not by way of limitation. It is contemplated that the invention has general application to analytical and methodical embodiments of classifying a corpus of documents according to a topic or sentiment contained in those documents in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The present disclosure describes methods and systems for information management, including management and classification of inbound communications to an organization or entity using one or more classifiers and/or a clustering algorithm on a document corpus. The one or more classifiers are configured to identify a topic of the documents in the corpus. If a drift of the topic of the documents in one or more of the classifier is detected, the classifiers are rebuilt using classifiers trained to the new topics of the documents being processed. Such drift may occur when a new product or new feature of a product is introduced to consumers, which causes the consumers to encounter new customer support problems. Similarly, the management and classification of inbound communications may be performed by a clustering engine executing one or more clustering algorithms. When a topic drift of any of the clusters formed by the clustering engine is detected, the clustering engine may be modified to include more or different available clusters and the corpus of documents re-clustered. Alternatively, a reclustering of the corpus may be performed periodically.

The system can receive a document (e.g., an email or support request form) from a user and use one or more classifiers to identify a topic associated with the document. Identifying the topic also includes selecting the topic based on the probabilities provided by the classifiers.

Labeling a cluster based on a common characteristic shared by the documents in the cluster may be accomplished either manually or automatically to facilitate identifying issues or sentiment relating to a business entity. The document corpus can be augmented with some pre-labeled documents (possibly having various labels) before the clustering algorithm is executed. Several pre-labeled documents can end up in a given cluster upon the execution of the clustering algorithm. The label with the most number of occurrences in a given cluster can be selected as a label for the given cluster. Described herein are metrics that facilitate an automatic determination of whether the selected label can be applied to the given cluster (or documents therein).

A label can identify various types of information such as a subject or theme of a given cluster and therefore facilitate classification. Document clusters may be labeled by manual inspection where a subject matter expert retrieves samples from different clusters and labels the clusters based on information from the samples. Alternatively, or in addition, the system may be configured to automatically determine a label for each created cluster.

A corpus of documents can be separated into various clusters. A cluster can be a combination of documents in which all of the documents share one or more characteristics based on one or more common characteristics. In some implementations, the clusters produced from a corpus are labeled with an identifier that identifies the commonly shared characteristic of the documents that are members of the cluster. For example, if a corpus includes electronic mails (e-mails) from users to a customer support department of a computer manufacturer, such e-mails can be clustered into various clusters depending on, for example, the type of complaints or comments that the e-mails pertain to. In such cases, the clusters may be assigned labels or identifiers such as "hardware comments," "software complaints," and "firmware" to facilitate ease of further processing. For example, once the user e-mails are grouped and labeled into the abovementioned clusters, the emails can be distributed to suitable personnel for further handling.

FIG. 1 is a diagram of an example environment 100 for grouping documents from a document corpus 110. In the environment 100, users of a product (illustrated as users 102, 103 and 104) provide information, such as complaints, comments relating to the product, etc. that forms at least a portion of the document corpus 110. Although only three users are depicted, any number of users may provide the information. The number of users may even reach into the hundreds, thousands, tens of thousands, or more. The product can be considered as any type of goods or service. For example, the product can be, but is not limited to, an e-mail service, an advertising service, an Internet Protocol (IP) telephone service, a computer operating system, an electronic device such a computer or smartphone, or an automobile. The information can be provided, for example, in customer-related meetings such as customer support sessions.

In some implementations, the user-provided information can include feedback about the product's performance including, but not limited to, general complaints about the product, issues relating to specific features or operation of the product, and positive comments about the product. The feedback may include statements such as "my laptop would not boot," "my wireless keyboard does not seem to work," "I can't access my advertising account," and "color prints from my printer are getting smudged." Even though the environment 100 relates to customer service or support scenario, it should be noted that the present disclosure applies to various other environments in which documents are grouped into clusters. For example, the methods and systems described can be applied/used to cluster patents or technical literature based on different technologies, or to cluster a collection of movie reviews based on genres.

In some implementations, the documents in the corpus 110 can vary according to the environment or application. For example, in the customer support environment 100 depicted in FIG. 1, the corpus 110 includes documents related to feedback from the users 102-104 through any appropriate mechanisms, including telephones and computers. The information may include documents such as e-mail messages 105, posts to discussion forums 106, transcriptions of telephone calls 107, and any other document 108 that conveys feedback information, including, for example, records of chat sessions. Other documents 108 may also include data scraped from Internet sites and documents subscribed to from third party aggregators and data providers. The corpus 110 is provided to a server 120, which can include a clustering module 125 and a ranking module 130. Clustering module 125 may execute a clustering algorithm to group together documents from the corpus 110 that are similar to each other in some sense. In some implementations, the clustering module 125 can be a part of a clustering engine that resides on the server 120.

In some implementations, clustering can include grouping documents based on some information that is common to the documents. For example, the clustering module 125 can identify information, such as words, phrases, or other textual elements that are common to two or more documents of the corpus. In some implementations, the words are not predefined, but rather are identified based simply on their presence in the documents. Such information, that is not predefined but extracted based on parsing the documents, may be referred to as unplanned information. The clustering module 125 can define clusters corresponding to such unplanned information (e.g., words), and associate documents with corresponding clusters. For example, the clustering module 125 may identify one or more words or phrases, such as "inbox" and "capacity" that are common to at least some of the documents. In such cases, since unplanned terms are used to define clusters, the clustering module 125 can define clusters that might not have been predicted and, therefore, might not otherwise have been identified.

In the above example, the clustering module 125 may define a cluster that contains documents (or references to documents) having both the words "inbox" and "capacity" in their text. Another cluster may include documents having both the words "drop" and "call," and so on. In some implementations, one or more rules can specify, e.g., what words may be used for clustering, the frequency of such words, and the like. For example, the clustering module can be configured to group together documents where a given word or synonyms of the given word are present more than five times. In another example, the clustering module 125 can be configured to group together documents where any of a predefined set of words is present at least once.

In some implementations, one or more sets of pre-labeled documents can be added to the document corpus 110 to create an augmented corpus. For clustering purposes, the labels of the pre-labeled documents can be ignored. Once a clustering algorithm is executed on the augmented corpus, the pre-labeled documents can be tracked to determine their distribution in the various resultant clusters. Further, such tracking may be used to facilitate automatic labeling of the resultant clusters. For example, if the augmented corpus includes pre-labeled documents labeled "A", "B" or "C" and a particular resultant cluster includes 80% of the pre-labeled documents labeled "A" but only 30% of the pre-labeled documents labeled "B", a probability that other documents within the cluster are related to subject matter identified by the label "A" can be higher than a probability that such documents are related to subject matter identified by label "B". Therefore, the cluster (or documents within the cluster) could be labeled "A" with a high degree of confidence. In some implementations, one or more metrics could be defined to assist in the determining if and/or how a particular cluster can be labeled, e.g., based on the distribution of pre-labeled documents within the clusters.

In some implementations, the clustering module 125 produces document clusters 150, 151, 152. Although only three clusters are shown, any number (e.g., one or more) of clusters may be produced. In unsupervised clustering, the significance of a given cluster (e.g. what the cluster represents) is generally unknown. Accordingly, each cluster may need to be labeled. Labeling a cluster with a label can include assigning the label to each document within the cluster. The labeling process may be automatic or manual. For example, a sample 155 may be chosen (e.g. pseudo randomly) from the cluster 152 and read by an operator 160 to identify the subject matter of the sample 155. The cluster 152 may be characterized based on the subject matter identified for one sample (e.g., sample 155) or multiple samples. For example, in a cluster where the words "inbox" and "capacity" occur frequently in the documents, one or more samples can be analyzed to identify that the subject matter generally pertains to complaints on e-mail inbox capacity. In such cases, the cluster can be labeled accordingly (e.g., with a label: "problems with email inbox capacity").

In some implementations, a cluster (e.g. cluster 150) can be labeled by automatically analyzing one or more samples (e.g. a sample 165) from the cluster 150. In such cases, the automatic analysis of the sample can be performed on a computing device, such as the server 120 or other type of computing device. In some implementations, the server 120 can include a labeling engine (not shown) that facilitates operations to automatically label document clusters. In some implementations, where the document corpus 110 is augmented by pre-labeled documents, a cluster can be automatically labeled based on determining a distribution of the pre-labeled documents contained in the cluster. For example, a cluster can be automatically labeled based on the number of pre-labeled documents with a given label that end up in the cluster. In some implementations, a cluster can be automatically labeled based on a relative proportion of a given label to the total number of pre-labeled documents. Such a determination, and hence the automatic labeling on the cluster can be facilitated by the labeling engine. Examples of such automatic labeling are described below with reference to FIG. 2. The labeling engine can reside or execute on a computing device such as the server 120. In some implementations, the labeling of the clusters can be facilitated using a combination of automatic and manual methods. For example, if an automatic method fails to unambiguously determine a label for a particular cluster, the cluster may be delegated for further processing by an individual such as the operator 160.

In some implementations, the server 120 can also include a document module 135 for processing the corpus 110. For example, in a customer support environment, the document module 135 may retrieve different types of communications from various users, locations, and format and process the communications such that they share a common document (e.g., textual) format. The communications may be retrieved from a voicemail server (e.g., transcribed telephone calls), from a forum server (e.g., forum posts), from an e-mail server (e.g., e-mails), or from other sources (e.g., servers or other devices) not described here. Retrieval may include requesting and receiving communications relating to a product or service from the various sources and/or performing a direct memory access of storage locations in the various sources for the communications. In some implementations, each source can maintain one or more databases or the like, that stores the various communications, and each source can perform keyword searches of their databases, e.g., to identify communications relating to particular products, services or other items. In some implementations, a communication can be parsed to identify the communication.

The document module 135 may format the documents that it receives so that the resulting documents have a common format. For example, tags or other identifiers, if present, may be removed from the retrieved documents or otherwise modified. Other types of formatting may also be performed, e.g., to remove or modify any formatting codes, headers or other such information.

In some implementations, the document clusters may be ranked using the ranking module 130, which may also be executed on the server 120. In some implementations, the ranking module 130 ranks document clusters according to one or more metrics. For example, the ranking module 130 may rank the clusters 150, 151 and 152 according to an estimated time to resolution of an issue represented by the cluster (e.g., issues represented by a cluster "software update" may typically be resolved faster than issues represented by a cluster "hardware malfunction"), a label assigned to the cluster, a number of documents in a cluster, a designated importance of subject matter associated with a cluster, identities of authors of documents in a cluster, or a number of people who viewed documents in a cluster, etc. In an example, a cluster representing an issue that historically has taken a longer time to resolve may be ranked higher than a cluster representing an issue with a shorter historical time to resolution. In another example, several metrics are weighted and factored to rank the clusters. The ranking module 130 can be configured to output the rankings to a storage device (e.g., in the form of a list or other construct).

The information obtained by grouping documents into clusters and labeling the clusters may be used to identify problem(s) or other issues with a product or service and to provide appropriate resolution paths. For instance, in response to identifying a cluster (with a label) as "problems with e-mail inbox capacity," a person or department responsible for maintenance of e-mail systems can be contacted to resolve the problem. The resolution could involve instructing the person or department to increase the capacity of e-mail inboxes, or to provide users with an option to increase the inbox capacity (e.g., for an additional fee). The rankings provided by the ranking module 130 may indicate level(s) of importance to the document clusters. The topic(s) (e.g., problems or other issues), identified by the labels assigned to the document clusters, may be addressed in order of importance. For example, if the cluster having "problems with e-mail inbox capacity" is ranked highest among the clusters (and, thus, most important), issues with email capacity may be addressed first, followed by other topics in order of importance.

Figure 2:
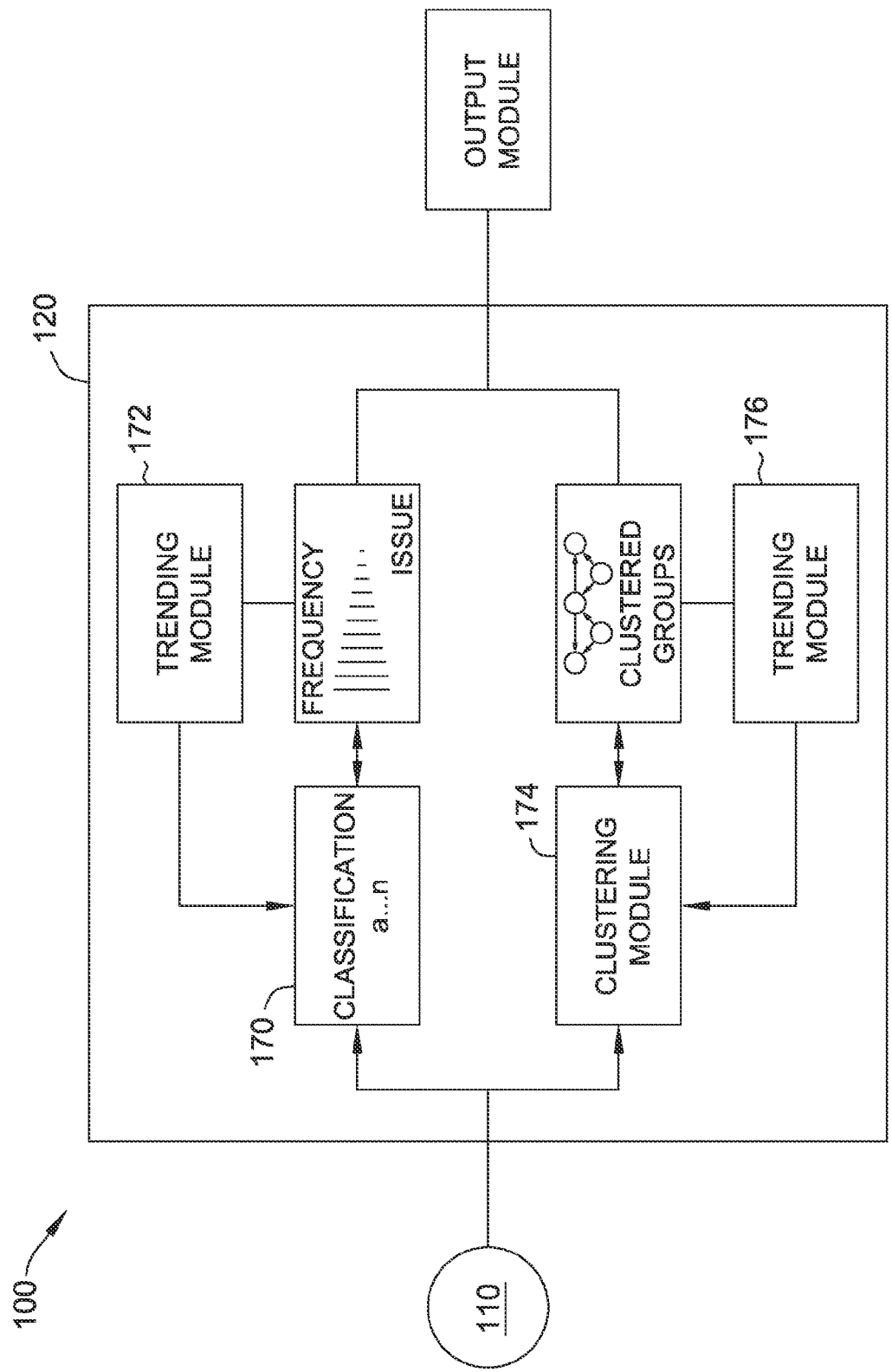

FIG. 2 is a data flow diagram of environment 100 in accordance with another embodiment of the present invention. In the exemplary embodiment, server 120 includes one or more classifiers 170. Each classifier 170 can be configured to identify a particular issue or topic. For example, the classifier 170a can be configured to identify login problems, the classifier 170b can be configured to identify billing problems and the classifier 170n can be configured to identify lost data issues. Each classifier 170 can apply a generalized expectation criteria (GE) classification algorithm to identify a particular issue or topic. In some implementations, the GE classification algorithm relies on a maximum entropy algorithm to optimize the classification model based on constraints associated with the training data. Each classifier 170 can analyze the documents from corpus 110 and provide a probability that the topic included in the document is the same as or similar to the topic or topics associated with a particular instance of classifier 170. For example, classifier 170a, which is configured to identify login problems, can analyze the documents of corpus 110 and determine the probability that the topic associated with the user document is related to login problems.

As each document is classified, a trend of a change of the number of documents in each classifier may be detected using a trending module 172. The trends may be analyzed to discover anomalies in the trends. The anomalies may be related to the introduction of a new feature or product. For example, within a time period after the release of a new product or feature, an increased number of documents that include a topic of information relating to a customer support issue or sentiment toward the newly introduced product or feature may be expected. Consumers using the new product and/or feature may be unfamiliar or unskilled in its use and may suspect the new product and/or feature may be operating incorrectly. This suspicion may cause the users to generate a customer service document, which would be included in corpus 110. By detecting anomalies in the trends a potential misclassification of documents may be detected. When a misclassification is detected, server 120 or other components of environment 100 may command a reclassification of the documents to be performed. The reclassification may include a manual or automatic review of the documents, for example, by a subject matter expert or rule base. The review provides additional classification rules which when applied to classifiers 170 to properly classify each of the incoming documents coming into corpus 110.

Similarly, when corpus 110 is being analyzed for customer support issues or sentiment using a clustering module 174, the number of documents being grouped into various clusters may exhibit an anomalous trend subsequent to the introduction of a new product or feature. As described above, because new customer support issues or sentiment based on consumers' experience with a new product or feature may cause clustering module 174 to group documents indicating customer support issues or sentiment that applies directly to a new product or feature with documents that do not relate directly to customer support issues or sentiment that relate to the new product or feature. Such grouping tends to reduce a confidence metric associated with each group and may also affect a trend of the numbers of documents being clustered into the various groups. The anomalous trends may be detected using a trending module 176. Trending module 176 may then command a regrouping of corpus 110 using additional groups to permit documents indicating customer support issues or sentiment that applies directly to the new product or feature to be properly grouped within their own group.

Figure 3:
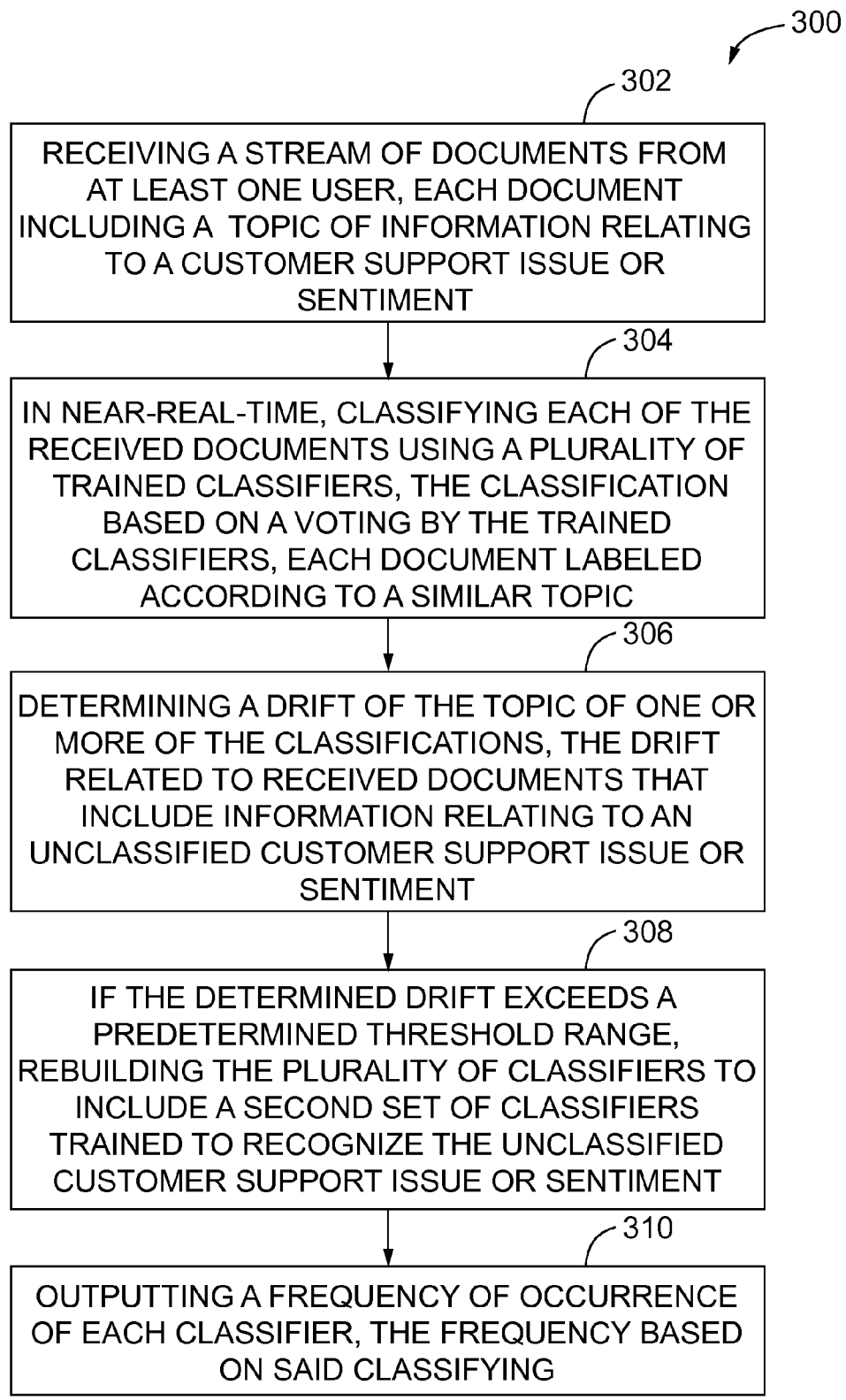

FIG. 3 is a flow chart of a computer-implemented method 300 of remediating topic drift for classifying documents. In the exemplary embodiment, method 300 is implemented by executing instructions stored on a computer-readable medium. Method 300 includes receiving 302 a stream of documents from at least one user wherein each document includes a topic of information relating to a customer support issue or sentiment. In near-real-time, each of the received documents is classified 304 using a plurality of trained classifiers. The classification is based on a voting by the trained classifiers and each document is labeled according to a similar topic. Method 300 also includes determining 306 a drift of the topic of one or more of the classifications wherein the drift is related to received documents that include information relating to an unclassified customer support issue or sentiment. In various embodiments, the drift of the topic of one or more classifications is determined using a manual review of at least some of the already classified documents by a subject matter expert. In one embodiment, a trend of the frequency of occurrence of classifications of documents is used to determine a mislabeling of documents. If the determined drift exceeds a predetermined threshold range, the plurality of classifiers rebuilt 308 to include a second set of classifiers trained to recognize the unclassified customer support issue or sentiment. Moreover, the plurality of documents may be re-clustered based on an expiration of a predetermined time period. The frequency of occurrence of the documents placed into each classifier is output 310 to the user.

Figure 4:
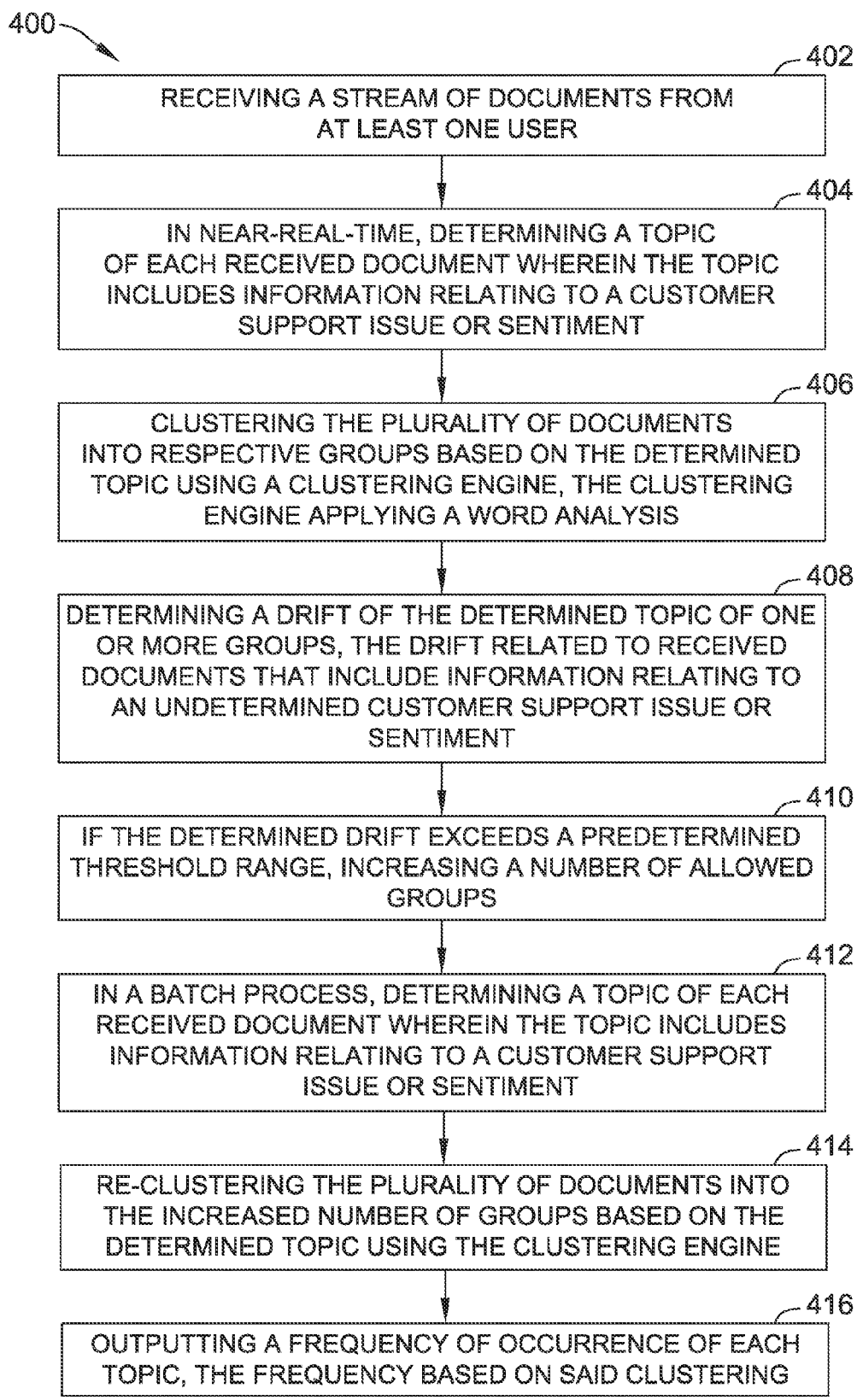

FIG. 4 is a flow chart of a computer-implemented method 400 of remediating topic drift for clustering documents. In the exemplary embodiment, method 400 is implemented by executing instructions stored on a computer-readable medium. Method 400 includes receiving 402 a stream of documents from at least one user. In near-real-time, for each document in the stream, a topic of each received document is determined 404 wherein the topic includes information relating to a customer support issue or sentiment. The plurality of documents are clustered 406 into respective groups based on the determined topic using a clustering engine that applies a word analysis to the documents. A drift of the determined topic of one or more of the groups is determined 408. The topic drift is related to received documents that include information relating to an undetermined customer support issue or sentiment. Because the clustering does not have groups available to associate documents with new topics, the documents with the new topics are misgrouped in a group that is as close as possible, whenever the misgrouping increases an inaccuracy of the clustering. If the determined drift exceeds a predetermined threshold range, the number of allowed groups is increased 410 to permit more accurate grouping of the documents with the new topic material. To regroup the received documents using the increased number of available groups, in a batch process, a topic of each received document is determined 412 in light of the increased number of available groups wherein the topic includes information relating to a customer support issue or sentiment. The plurality of documents are re-clustered 414 into the increased number of groups based on the determined topic using the clustering engine. A frequency of occurrence of each topic is the re-clustered groups is then output to the user wherein the frequency is based on the re-clustering.

Figure 5:
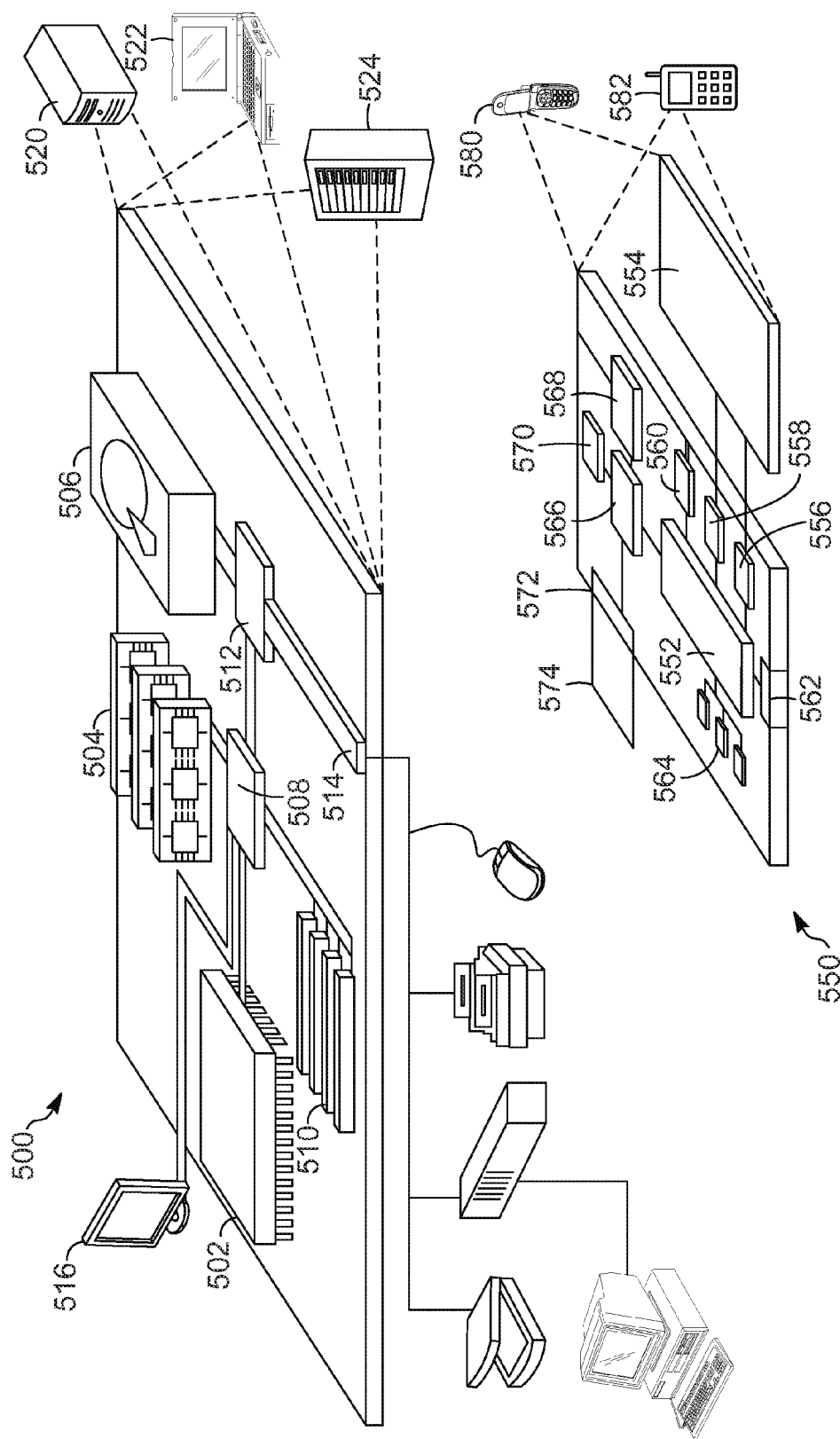
FIG. 5 is a block diagram showing example or representative computing devices and associated elements that may be used to implement the systems of FIGS. 1 and 2.

FIG. 5 is a block diagram showing example or representative computing devices and associated elements that may be used to implement the systems of FIGS. 1 and 2. FIG. 5 illustrates an exemplary generic computing device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed controller 508 connecting to memory 504 and high-speed expansion ports 510, and a low speed controller 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed controller 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-bus 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as computing device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, which may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others.

Such communication may occur, for example, through radio-frequency transceiver 568. In addition, short-range communication may occur, such as using a Bluetooth, Wi-Fi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, a computer tablet, or other similar mobile device.

As will be appreciated based on the foregoing specification, the above-described embodiments of the disclosure may be implemented using computer programming or engineering techniques including computer software, firmware, hardware or any combination or subset thereof, wherein the technical effect is for an incremental porting of high level language code to the target processor code such that only a certain portion of the high level language code is ported to the target processor and the remaining code remains intact on the host computer. A system verification is performed by executing the ported code in the target processor while executing the remaining code on the host computer. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 500 and/or 550) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 500 and 550 are configured to receive and/or retrieve electronic documents from various other computing devices connected to computing devices 500 and 550 through a communication network, and store these electronic documents within at least one of memory 504, storage device 506, and memory 564. Computing devices 500 and 550 are further configured to manage and organize these electronic documents within at least one of memory 504, storage device 506, and memory 564 using the techniques described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method of classifying documents including executing instructions stored on a non-transitory computer-readable medium, said method comprising:
    receiving a stream of documents from at least one user, each document including a topic of information relating to a customer support issue or sentiment;
    in near-real-time, performing a first classification of each of the received documents using a plurality of trained classifiers, the classification based on a voting by the trained classifiers, each document labeled according to a similar topic;
generating a trend of a change of a number of documents classified by each classifier;
analyzing the trend for anomalies in the trend related to an introduction of a new feature or product, the anomaly occurring within a predetermined time period after the introduction of the new product or feature;
determining a drift of the topic of one or more of the first classifications using the analyzed trend, the drift related to received documents that include information relating to an unclassified customer support issue or sentiment;
if the determined drift exceeds a predetermined threshold range, rebuilding the plurality of classifiers to include a second set of classifiers trained to recognize the unclassified customer support issue or sentiment;
performing a second classification of each of the received documents using the rebuilt plurality of trained classifiers; and
outputting a frequency of occurrence of each classifier, the frequency based on said classifying.

2. A method in accordance with claim 1, wherein the plurality of documents includes one or more of electronic mail documents, forum post documents, telephone call transcript documents and chat session record documents.

3. A method in accordance with claim 1, wherein determining a drift of the topic of one or more of the classifications comprises determining a drift of the topic of one or more classifications using a manual review by a subject matter expert.

4. A method in accordance with claim 1, wherein determining a drift of the topic of one or more of the classifications comprises determining a drift of the topic of one or more classifications using an automatic classifier training method.

5. A method in accordance with claim 1, further comprising trending a frequency of occurrence of classifications to determine mislabeling of documents.

6. A method in accordance with claim 1, further comprising reclassifying the plurality of documents based on an expiration of a predetermined time period.

7. A computer system for remediating topic drift in a corpus of documents, the system comprising a computer device coupled to a user interface and a memory device, the system comprising:
a classifier and a clustering engine configured to execute on the computing device, the classifier configured to receive a stream of documents from at least one user using the user interface, each document including a topic of information relating to a customer support issue or sentiment, the classifier configured to classify each of the received documents using a plurality of trained classifiers, the classification based on a voting by the trained classifiers, each document labeled according to a similar topic, said clustering engine configured to cluster the plurality of documents into respective groups based on the determined topic using said clustering engine, the clustering engine configured to apply a word analysis;
a trending module configured to generate a trend of a change of a number of documents classified by each classifier, said trending module configured to analyze the trend for anomalies in the trend related to an introduction of a new feature or product, the anomaly occurring within a predetermined time period after the introduction of the new product or feature; and
a drift engine configured to execute on the computing device and configured to determine a drift of the topic of one or more of the classifications using the analyzed trend, the drift related to received documents that include information relating to an unclassified customer support issue or sentiment;
if the determined drift exceeds a predetermined threshold range, at least one of rebuild the plurality of classifiers to include a second set of classifiers trained to recognize the unclassified customer support issue or sentiment and re-cluster the plurality of documents into an increased number of groups based on the determined topic using the clustering engine.

8. A system in accordance with claim 7, wherein at least one of said classifier and said clustering engine is configured to receive a plurality of documents containing text referring to a customer support issue.

9. A system in accordance with claim 7, wherein at least one of said classifier and said clustering engine is configured to receive a plurality of documents including one or more of electronic mail documents, forum post documents, telephone call transcript documents and chat session record documents.

10. A system in accordance with claim 7, wherein at least one of said classifier and said clustering engine is configured to determine the drift of the topic of one or more classifications using a manual review by a subject matter expert.

11. A system in accordance with claim 7, wherein at least one of said classifier and said clustering engine is configured to determine the drift of the topic of one or more classifications using an automatic classifier training method.

12. A system in accordance with claim 7, further comprising a trending engine configured to trend a frequency of occurrence of classifications to determine mislabeling of documents.

13. A system in accordance with claim 7, wherein said clustering engine is configured to re-cluster the plurality of documents based on an expiration of a predetermined time period.

14. A system in accordance with claim 7, wherein said clustering engine is configured to determine a drift of the determined topic of one or more groups using a separate clustering of at least one of the groups to determine a degree of non-similarity of the documents in the group, if the degree of non-similarity exceeds a predetermined non-similarity threshold said clustering engine is configured to re-cluster the plurality of documents.

15. One or more non-transitory computer-readable storage media having computer-executable instructions embodied thereon, wherein when executed by at least one processor, the computer-executable instructions cause the processor to:
receive a stream of documents from at least one user;
in near-real-time,
determine a topic of each received document wherein the topic includes information relating to a customer support issue or sentiment;
cluster the plurality of documents into respective groups based on the determined topic using a clustering engine, the clustering engine applying a word analysis;
generate a trend of a change of a number of documents classified by each classifier;
analyze the trend for anomalies in the trend, the anomalies related to an introduction of a new feature or product, the anomaly occurring within a predetermined time period after the introduction of the new product or feature; and
determine a drift of the determined topic of one or more groups using the analyzed trend, the drift related to received documents that include information relating to an undetermined customer support issue or sentiment;

if the determined drift exceeds a predetermined threshold range, increase a number of allowed groups;

in a batch process, determine a topic of each received document wherein the topic includes information relating to a customer support issue or sentiment;

re-cluster the plurality of documents into the increased number of groups based on the determined topic using the clustering engine; and output a frequency of occurrence of each topic, the frequency based on said clustering.

16. The computer-readable storage media of claim 15, wherein the computer-executable instructions further cause the processor to determine a drift of the determined topic of one or more groups using a manual review by a subject matter expert.

17. The computer-readable storage media of claim 15, wherein the computer-executable instructions further cause the processor to determine a drift of the determined topic of one or more groups using a separate clustering of at least one of the groups to determine a degree of non-similarity of the documents in the group, if the degree of non-similarity exceeds a predetermined non-similarity threshold, re-clustering the plurality of documents.

18. The computer-readable storage media of claim 15, wherein the computer-executable instructions further cause the processor to trend a frequency of occurrence of topics associated with each group to determine mislabeling of documents.

19. The computer-readable storage media of claim 15, wherein the computer-executable instructions further cause the processor to re-cluster the plurality of documents based on an expiration of a predetermined time period.

20. The computer-readable storage media of claim 15, wherein the word analysis is based on a similarity of words contained in each document.

\* \* \* \* \*